United States Patent [19]

Turloff

[11] 4,231,163
[45] Nov. 4, 1980

[54] LEVEL INDICATING AND ELEVATION INDICATING DEVICE

[76] Inventor: Harry E. Turloff, 3378 Clyde Dr., Port Huron, Mich. 48060

[21] Appl. No.: 10,969

[22] Filed: Feb. 9, 1979

Related U.S. Application Data

[63] Continuation-in-part of Ser. No. 776,907, Mar. 11, 1977, abandoned.

[51] Int. Cl.³ .......................... G01C 5/04; G01C 9/22
[52] U.S. Cl. ........................................ 33/367; 33/366
[58] Field of Search .................................. 33/366, 367

[56] References Cited

U.S. PATENT DOCUMENTS

| | | | |
|---|---|---|---|
| 2,040,708 | 5/1936 | Persson | 33/378 |
| 2,804,692 | 9/1957 | Karstens | 33/367 X |
| 2,838,844 | 6/1958 | Sackett | 33/367 X |
| 3,048,927 | 8/1962 | Maloff | 33/367 X |
| 3,269,023 | 8/1966 | Calkins | 33/367 X |
| 3,645,135 | 2/1972 | Hadley | 33/367 |
| 3,849,898 | 11/1977 | Turloff | 33/367 |

FOREIGN PATENT DOCUMENTS 966136  10/1950  France ...................... 33/378

*Primary Examiner*—Charles E. Phillips

*Attorney, Agent, or Firm*—Clarence A. O'Brien; Harvey B. Jacobson

[57] ABSTRACT

A pair of upright stands are provided and include enlarged bases by which the stands may be supported on variously elevated support surfaces. Each stand has a vertically elongated support mounted thereon for adjustable vertical positioning therealong and each stand has a scale thereon by which the positioning of the support therealong may be precisely determined and adjusted as desired. Each support includes an upstanding transparent tube section and the lower ends of the tube sections are connected by an elongated flexible connecting tube member including an expandable and contractable reservoir. One or both of the transparent tube sections may be provided with a float therein and the upper end of the float will have its position relative to its support and the position of its supporting liquid accurately determined either through the utilization of a scale supported from the upper end of the tube, a micrometer supported from the upper end of the support and/or a float actuatable switch carried by the upper end of the support. Further, one stand and the associated transparent tube may be omitted with the float actuatable switch provided on the retained transparent tube electrically connected to a signal generator provided for the remote end of the flexible connecting tube member.

11 Claims, 9 Drawing Figures

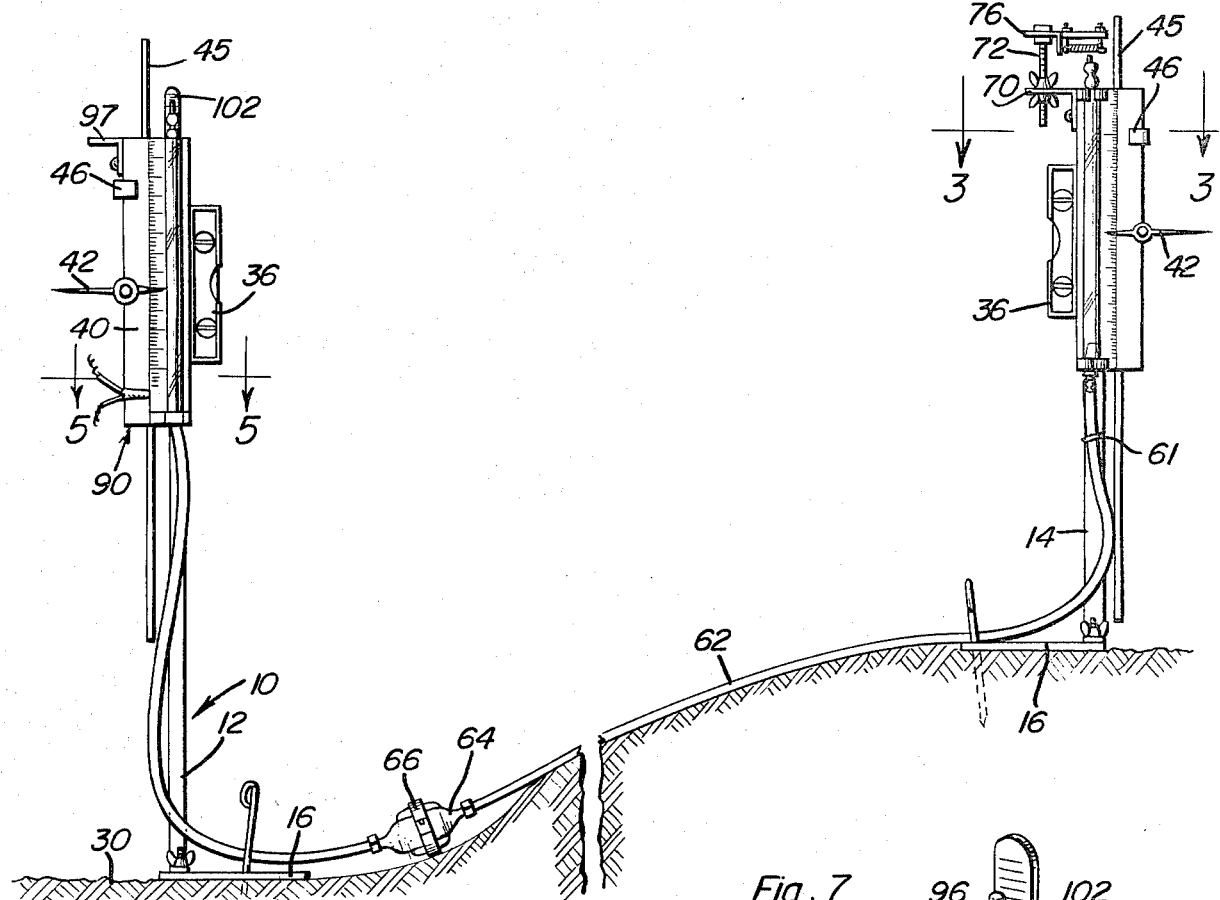
Fig. 1
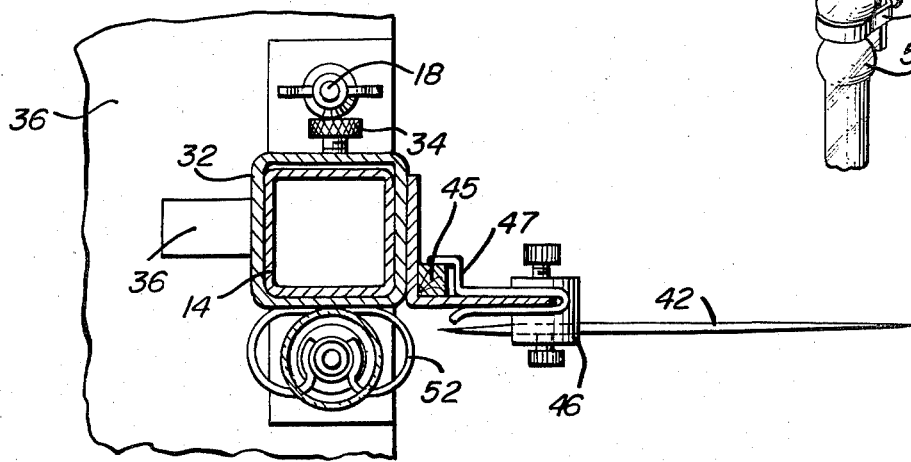
Fig. 3
Fig. 7

4,231,163

LEVEL INDICATING AND ELEVATION INDICATING DEVICE

CROSS-REFERENCE TO RELATED APPLICATION

This application comprises a continuation-in-part of my co-pending U.S. application Ser. No. 776,907, filed Mar. 11, 1977, for Level Indicating and Elevation Indicating Device, now abandoned.

BACKGROUND OF THE INVENTION

The level indicating device of the instant invention represents a highly specialized precision height measuring instrument. Even though such an instrument has been long sought for indicating precise elevations at horizontally remote points, few successful attempts have been made to provide such an apparatus.

There are many instances in the building and construction trades wherein it is desired to establish similar or dissimilar elevations at horizontally remote points. Examples of previously known elevation indicating devices, including some of the general structural and operational features of the instant invention are disclosed in U.S. Pat. Nos. 327,564, 547,864, 914,945, 1,042,248, 1,463,738, 1,599,347, 2,614,572, 2,789,364, 3,015,167, and Re. 13,240. In addition, a quite similar indicating device is disclosed in my prior U.S. Pat. No. 3,849,898, which discloses a technique other than those disclosed in the first mentioned prior U.S. patents.

BRIEF DESCRIPTION OF THE INVENTION

The level indicating device of the instant invention comprises an improvement over the Elevation Indicating Apparatus of my above-noted prior patent in that considerably more precise readings in elevation may be determined. In addition, although most similar forms of level or elevation indicating devices require the utilization of two instruments and that each instrument be read for each elevation reading to be taken, the level indicating device of the instant invention includes structure whereby consecutive different elevation readings may be made by a single person adjacent only one of the instruments.

The main object of this invention is to provide a level indicating device that may be utilized not only to indicate identical elevations at horizontally remote locations but also specific dissimilar elevations at the same locations.

Another object of this invention is to provide a level indicating device utilizing a connecting hose having transparent opposite ends and containing a column of liquid therein, in order that the level of liquid in each hose end at horizontally remote locations establishes a relative position of supports, which can be verified by support adjustment to this indication and further liquid adjustment that positions the liquid to the indications of balance.

Still another object of this invention, in accordance with the immediately preceding object, is to provide an intermediate portion of the connecting hose with an expandable and contractable reservoir, that can regulate the effective column of liquid from a position adjacent one of the instruments, and a float actuatable switch mounted on the other instrument and electrically connected to a signal light on the instrument adjacent the reservoir.

A further object of this invention is to indicate elevation differences of two planes simultaneously, in accordance to their heights.

Another object of this invention is to provide a device that will repeatedly indicate the conditions of position without varying computations.

A further object of this invention is to provide a more effective method of observing fixed points by means of a micrometer adjustment to a float end that activates and deactivates the signal light by the liquid, a second float and the actuatable switch. The micrometer indication could be that of a circuit break.

Yet another object of this invention is to provide a level indicating device equipped with a micrometer support on the upper end of one of the slidably mounted hose supports and operative to render a micrometer reading of the associated float that is positioned by the action of the primary activating float.

Another important object of this invention is to provide a level indicating device having various scales thereon to facilitate the use of the level indicating device in various environments.

A final object of this invention to be specifically enumerated herein is to provide a level indicating device in accordance with the preceding objects and which will conform to conventional forms of manufacture, be of simple construction and easy to use, so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part thereof, wherein like numerals refer to like parts throughout.

BRIEF DESCRIPTION OF THE DRAWINGS

FIG. 1 is a side elevational view of the level indicating device of the instant invention with the stand thereof disposed at horizontally remote locations and the levels of liquid in the ends of the connecting hose indicating the difference in the elevations of the supports on their supportive stands;

FIG. 2 is an enlarged perspective view of the right hand stand illustrated in FIG. 1 and with the base thereof in exploded position;

FIG. 3 is an enlarged horizontal sectional view taken substantially upon the plane indicated by the section line 3—3 of FIG. 1;

FIG. 4 is an enlarged fragmentary elevational view of the upper end of the stand illustrated in FIG. 2 and with the vertical tube thereof illustrated in vertical section;

FIG. 5 is an enlarged fragmentary horizontal sectional view taken substantially upon a plane indicated by the section line 5—5 of FIG. 1;

FIG. 6 is an enlarged fragmentary elevational view of the upper end of the stand illustrated in FIG. 2 and similar to FIG. 4, but with the stand equipped with a micrometer measurement attachment as opposed to an electric circuit actuating switch.

FIG. 7 is an enlarged fragmentary perspective view of the upper end of the tube supported from the left hand stand illustrated in FIG. 1 and illustrating a scale-type float elevation indicating structure;

DETAILED DESCRIPTION OF THE INVENTION

Figure 8:
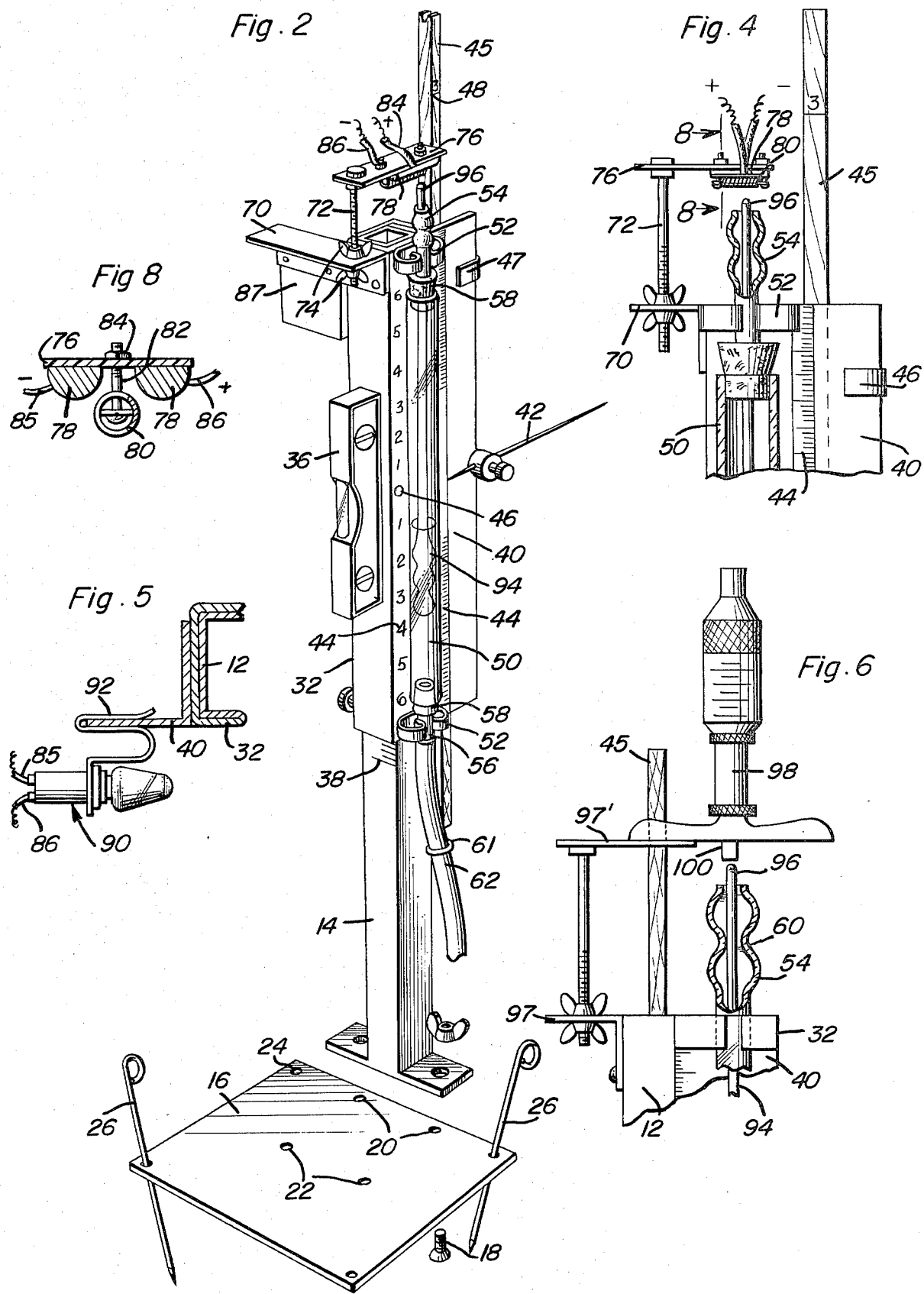
FIG. 8 is an enlarged fragmentary vertical sectional view taken substantially upon the plane indicated by the section line 8—8 of FIG. 4.

Referring now more specifically to the drawings, the numeral 10 generally designates the level indicating device of the instant invention. The device 10 includes a pair of upright "remote" and "base" stands 12 and 14, respectively, including horizontally enlarged bases 16 to which the lower ends of the stands 12 and 14 are removably secured by means of fasteners 18. The bases 16 include a first pair of apertures 20 through which the fasteners 18 may be secured in order to mount the lower ends of the stands 12 and 14 adjacent marginal edge portions of the bases 16 and a second pair of apertures 22 through which the fasteners 18 may be secured if it is desired to mount the lower ends of the stands 12 and 14 in centered positions on the bases 16. Further, the four corner portions of the bases 16 are provided with apertures 24 by which ground spikes 26 may be utilized to stationarily secure the bases 16 to supportive ground surfaces.

In FIG. 1 of the drawings it may be seen that the stand 12 is supported from the ground 30 at a lower elevation than the stand 14.

Each of the stands 12 and 14 has a tubular support sleeve 32 slidably mounted thereon and each support sleeve 32 includes a set screw 34 threadedly engaged therewith by which the support sleeve 32 may be secured in adjusted vertical position on the corresponding stand. It may also be seen from FIGS. 1 and 2 of the drawings that each of the support sleeves 32 includes a level 36 whereby the stands 12 and 14 may be shimmed, if desired, in order to be disposed in exactly vertical position.

The stands 12 and 14 are provided with vertical scales 38 with which the slidable support sleeves 32 may be registered in order to determine the elevation of the sleeves 32 above the bases 16 and each sleeve 32 includes a mounting flange 40 from upon which a pointer 42 is adjustably slidably mounted. The sleeves 32 have scales 44 thereon, including center indicia 46, with which the corresponding pointer 42 is horizontally registrable and each flange 40 has an extension rod 45 removably supported therefrom by means of a spring clip 47 and the rods 45 may be vertically adjusted relative to the support sleeves 32 and include scale indicia 48 thereon by which the vertical adjustment of the height or extension rods 45 relative to the support sleeves 32 may be determined.

A transparent tube section 50 is supported from one or both of the support sleeves 32 by means of a pair of spring clamps 52 and each tube section has upper and lower tubular fittings 54 and 56 mounted in its upper and lower ends by means of centrally apertured corks or stoppers 58 and the tubular fittings 54 and 56 are longitudinally corrugated, as at 60, and clampingly engaged by the clamps 52.

The opposite ends of an elongated flexible transparent tube 62 are removably coupled over the tubular fittings 56 and the tube 62 has an expandable and contractable reservoir 64 serially connected therein and provided with a band-type clamp 66 by which the effective internal volume of the reservoir 64 may be adjusted. The reservoir 64 is disposed closely adjacent the "remote" stand 12 in order that an operator of the apparatus 10 adjacent the stand 12 may make desired changes in the internal volume of the reservoir 64. Further, the end of the tube 62 adjacent one of the stands includes a slidable ring 61 thereon similar to that provided on the apparatus disclosed in my above noted prior U.S. patent.

The upper end of the sleeve 32 supported from the "base" stand 14 includes an angle iron support 70 from which a vertically adjustable support rod 72 is supported by means of a pair of wing nuts 74. The upper end of the support rod 72 has a horizontal plate 76 constructed of dielectric material supported therefrom and a pair of first and second spaced generally parallel semi-cylindrical contact bars 78 are supported from the underside of the plate 76. In addition, a very lightweight third spring contact 80 is suspended from the plate 76 by threaded fasteners having their upper ends adjustably secured through the plate 76 by threaded nuts 84. The contact 80 is positioned closely adjacent and between the confronting lower surfaces of the contact bars 78 and the central portion of the third contact 80 may be urged slightly upwardly into contact with both of the contacts 78 in order to close the switch assembly defined by the contacts 78 and 80.

A first conductor 85 is provided and is electrically connected to one contact 78 and a second conductor 86 is provided and is electrically connected to the second contact 78. A battery pack 87 supported from the bracket 70 is serially connected in one of the conductors 85 and 86 and the latter are electrically connected to a light assembly referred to in general by the reference numeral 90 removably supported from the flange 40 of the support sleeve carried by the stand 12 by means of a spring clip 92.

At least one of the tube sections 50 has a float 94 mounted therein and the upper end 96 of the float 94 defines a vertical shank portion projecting upwardly through the upper end of the fitting 54 and is engageable with, for the upward displacement of, the contact 80. Therefore, an increase in the level of water within the tube section 50 may cause the float 94 to be elevated within the tube section 50 sufficiently to engage the upper end of the float 94 with the contact 80 in order to displace the latter slightly upwardly into contact with both of the contacts 78 to thereby electrically actuate the light assembly 90 carried by the stand 12.

In conjunction with the light assembly 90 mechanism and its actuating contacts 78 and 80, a second angle iron support 97 may be included on the stand 12 and support another horizontal plate 97' from which a micrometer 98 is supported and the adjustable rod portion 100 of the micrometer 98 may be utilized to accurately determine changes in the elevation of the upper end 96 of the float 94 relative to the sleeve 32 supported from the stand 12. Still further, the upper end of the fitting 54 on the stand 12 may have a scale 102 supported therefore by means of a spring clip 104 and the scale 102 may be utilized to determine the height of the upper end 96 of the float 94 above the upper end of the fitting 54.

In operation, the stands 12 and 14 may be initially positioned at the same elevation of stand 14 in FIG. 2. Both supports 32 are adjusted flush with top of stands 12 and 14. The tube on stand 12 (which tube may comprise the corresponding end of hose 62) is adjusted to place the water level aligned with the "0" scale indicia 46. After this has been done, the support rod 72 on stand 14 is adjusted to complete the electric circuit through the action member 80 and end 96 of float 94. This adjustment causes the signal light 90 of stand 12 to be actuated. The rod 72 is then adjusted until light just goes "off" when the water is at the "0" scale indicia 46 on stands 12 and 14. Signal light 90 is set so it will indicate this condition. The purpose of the signal light 90 is to indicate when the water level position is at the "0" scale indicia 46 on stand 14. This procedure is carried out entirely on stand 14 eliminating the need that both stands 12 and 14 be on the same elevation and that the only needed additive would be the use of the second clamp 52 at the top of support sleeve 32 of stand 14. Hose end 62 would be adjusted to place the liquid on scale 44 to center indicia 46. Even though the set up for the signal light is considered to be a pertinent adjustment, a visual confirmation from time to time is desired and would be done in this manner, with or without an additional clamp 52.

When the stands 12 and 14 are on the same elevation and the sleeves 32 are in like positions, (visualize flush with tops of 12 and 14) pointers 42 (when on like numbers) rods 45 (when on like indications) and bases 16 are all in a level position to each other and the tube sections 50. Then, one of the stands may be removed to a horizontally remote location and the difference in the elevation of the liquid within the tube section 50 thereof may be noted. However, it may be necessary to adjust the adjustable clamp 66 so as to vary the internal volume of the reservoir 64 until such time as the float 94 is again at the position on the stand 14 to cause the switch comprising the contacts 78 and 80 to close and the light assembly 90 to be actuated. Precise adjustment of the internal volume of the reservoir 64 by the adjustable clamp 66 at which the light assembly 90 is actuated will place the level of liquid in the tube section 50 of the stand 12 at the same level of the liquid in the tube section 50 of the stand 14. In this manner, a single person may operate the level indicating device from a location remote from the stand 14. Still further, precise readings of the height of the float or floats 94 may be determined through the utilization of the micrometer 98 on the scale 102. The support sleeve 32 carried by the stand 12 may be equipped with a micrometer 98 or a scale 102 depending upon the type of reading instrument desired and smaller bases (not shown) may be used in lieu of bases 16 when the stands 12 and 14 must be used in restricted areas and the O ring markers 61 may slidably mounted on each section of tube 62 and are frictionally maintained in adjusted positions thereon.

Even though precise adjustments in the column of liquid connecting the tube sections 50 may be determined through the utilization of the switch comprising the contacts 78 and 80 in conjunction with the light assembly 90 and through the utilization of the micrometer 98 or the scale 102, it is possible that differences in density of the opposite ends of the column of liquid connecting the tube sections 50 will render inaccurate readings of the liquid levels in the sections 50. Accordingly, it may be necessary to recheck the liquid levels on the stands 12 and 14 while the stands are disposed in the same locations, such as the location of the stand 14 in FIG. 1.

Figure 9:
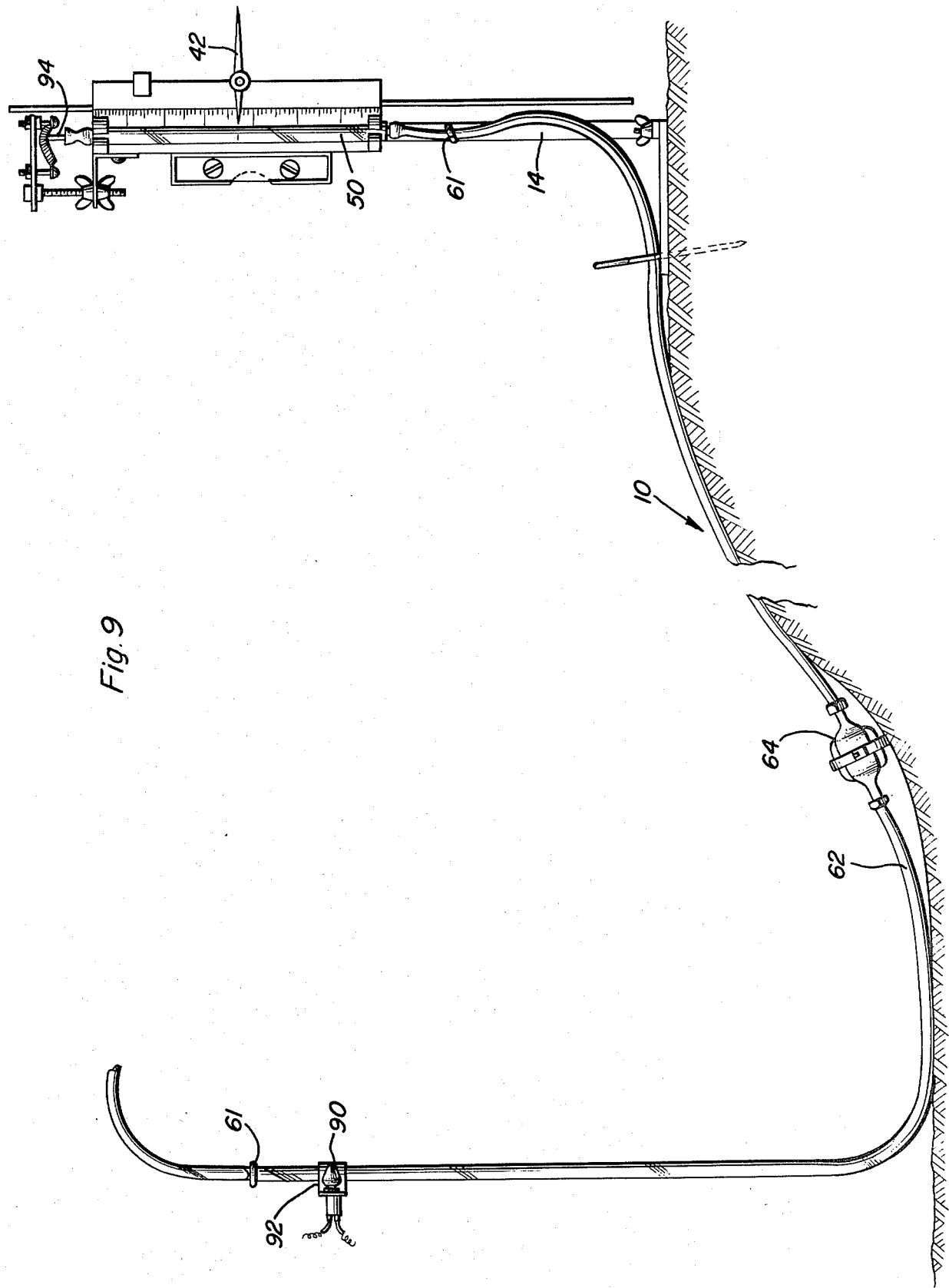
FIG. 9 is a side elevational view similar to FIG. 1, but illustrating a simplified manner of utilization of the invention.

If it is desired, the stand 12 and corresponding tube 50 may be omitted (the light assembly being retained on the corresponding end of hose 62), see FIG. 9. In this manner a plurality of precise elevation marks may be made at a plurality of locations remote from the base unit 14, the operation of this simplified form of the invention hereinafter being described in greater detail.

In the event it is suspected that the density of liquid (water in most instances) in the opposite ends of the tube 62 or the tube sections 50 is not the same due to the liquid adjacent one stand being of a different temperature or contaminated with a liquid of a different density, the device 10 may be checked for such a condition.

First, the stands 12 and 14 are placed on a level surface at the same elevation. The sleeve 32 on stand 12 may be lowered two inches whereupon the liquid level on scale 44 at stand 12 will be two inches above the "0" center indicia 46.

Then a small quantity of water is removed from the tube 62 at stand 12 and replaced by hot liquid and the level may now indicate a drop of $2\frac{1}{4}$ inches. At this point, the sleeves 32 are reversed in position on their respective stands with the sleeve 32 of stand 12 flush with the top and sleeve 32 of stand 14 shifted down 2 inches from the top of stand 14. The light 90 on stand 12 is again actuated and the liquid indicates a position of $1\frac{3}{4}$ inches, thus the density condition of the liquid is indicated. As the liquid cools and the operation is repeated the light goes off at 1 13/16 inches, $1\frac{7}{8}$ inches, 1 15/16 inches and finally at 2 inches, a true reading.

The liquid may be further checked for equal density by adjusting one sleeve 32 two inches lower. A first reading is then taken and the sleeves are reversed in position on their respective stands and a second reading is taken. The differences in the two readings indicates the density condition and the average of the differences produces a true reading.

It is further pointed out that visual scale readings through one or two tubes 50 is not most desirable. Rather, visual observations through the tube 62 are more advantageous.

With reference now more specifically to the simplified form of the invention illustrated in FIG. 9 wherein the stand 12 and the corresponding tube 50, slide 32 and other components supported from the slide 32 have been removed, the clip 92, having been disengaged from the mounting flange 40 of the sleeve 32 supported from the stand 12, is clipped into engagement with the end of the flexible transparent tube 62 remote from the stand 14. Then, after the apparatus 10 has initially been set up with the pointer 42 horizontally registered with the liquid level in the tube 50 and the desired elevation at the base location represented by the stand 14 and with the switch comprising the contacts 78 and 80 adjusted to the make and break elevation as determined by the upper end of the float 94 when the liquid level within the tube 50 is horizontally registered with the pointer 42, the end of the transparent tube 62 remote from the stand 12 may manually be transported to a distant remote location (perhaps with the hose end temporarily closed by a finger) out of sight of the stand 14 and also out of possible hailing distance of the stand 14 and the person manually transporting the hose end to the distant location may then raise the hose end until such time as the light assembly 90 is actuated. Then, by lowering and raising the free end of the hose 62 slightly, the exact elevation of the level of liquid at the make and break elevation thereof in the tube 50 may be accurately determined at the remote location by the level of the liquid in the adjacent hose end. Although the clip 92 may be clampingly engaged with the hose end, the clip 92 and the light assembly 90 supported therefrom may be disconnected from the hose end and supported in the same or different hand of the user of the apparatus 10 from that by which the hose end is supported. Of course, the conductors 85 and 86 maintain an electrical circuit between the light assembly 90, the battery pack 87 and the contact 78 with the contact comprising a switch for opening and closing the switch in response to decreases and increases in the elevation of liquid within the tube 50.

In the event the end of the hose 62 remote from the stand 14 may not be conveniently elevated sufficiently in order to cause the contact 80 to bridge the contacts 78 as the result of elevation of the float 94 within the tube 50, the reservoir 64 may be actuated through utilization of the band-type clamp 66 in order to increase the effective length of the column of liquid within the tube 62.

In any event, once the level indicating device 10 has been properly initially set at the base location in which the stand 14 is disposed, the exact elevation of the pointer 42 at numerous remote locations may be determined and indicated on adjacent structures by a single person using the device 10.

An O-ring marker 61 may be used on the hose end remote from the stand 14 to indicate the approximate liquid level therein when the liquid level at the stand 14 is at the switch "make and break" level. Further, the stand 14 may be omitted and the tube 50 may be suspended, by any support structure (not shown), from a suitable "base" structure.

Also, an air valve similar to air valve (64) of my prior U.S. Pat. No. 3,849,898 may be provided on the hose end 62 to maintain the level of liquid in the hose end 62 and the tube section 50 of FIG. 9 substantially constant while the hose end 62 is being transported from the "base" location adjacent stand 14 to a "remote" location, although spillage of some liquid from hose end 62 will not adversely affect the ability of the water level within hose end 62 at a "remote" location to duplicate the water level in tube section 50 at the "base" location when the float 94 is elevated sufficiently to close the switch contacts 78 and 80. However, the "remote" end of the hose may be provided with an air valve (not shown), or the "remote" hose end may be pinched closed during transport to a "remote" location in the absence of such an air valve.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. An upright for support from a horizontal surface and including vertical scale means thereon, a pair of transparent tubular members, means supporting one of said tubular members from said upright, the other tubular member being positionable adjacent said upright for vertical shifting therealong in registry with said scale means, liquid passage means communicating the lower ends of said tubular members and including a flexible hose section, said one tubular member having a float loosely received therein for free vertical shifting in response to increases and decreases in the level of liquid in said one tubular member upon which said float is floated, said one tubular member being open at its upper end, the upper portion of said float being defined by a vertical shank portion projecting upwardly through the open upper end of said one tubular member, switch means carried by said upright in vertically spaced relation above and aligned with said open upper end of said one tubular member, only, said switch means including a switch actuator vertically shiftable between upper and lower switch closing and switch opening positions, respectively, and engageable by the upper end of said shank portion, upon upward movement of said liquid in said one tubular member, for upward displacement of said actuator to said upper position thereof, indicator means including an electrically actuatable signal generator stationarily supported on said other of said tubular members, only, and with which said switch means is electrically connected for sole controlling operation of said signal generator in response to upward vertical shifting of said actuator to the switch closing position, at least said other tubular member being transparent, whereby the shifting of liquid level therein sufficient to elevate said float in said one tubular member toward engagement of said shank portion with said switch actuator may be closely visually monitored.

2. The combination of claim 1 wherein said liquid passage means includes a volume varying means intermediate said tubular members and adjacent said other tubular member operative to adjustably vary the internal volume thereof.

3. The combination of claim 2 wherein said volume varying means includes an expandable and contractable reservoir communicated with said hose section.

4. The combination of claim 1 including a second upright, means supporting said other tubular member from said second upright for adjustable shifting therealong.

5. An elevation indicating device including elongated liquid conduit means having transparent opposite end portions and including at least a midportion disposed between said opposite end portions which is flexible, one of said end portions having a float loosely received therein for free vertical shifting in response to increases and decreases in the level of liquid in said one end portion, support means for support from a suitable supportive structure, means stationarily supporting said one end portion from said support means, switch means stationarily supported on said one end portion relative to said float, and with which said float is operatively associated for opening and closing said switch means in response to vertical oscillation of said liquid in said one end portion, indicating means including electrical signal generator means supported on the other of said end portions, only, and with which said switch means is electrically connected for sole controlling actuation and deactuation of said signal generator means, through said switch means, responsive to vertical oscillation of said float in said one end portion.

6. The combination of claim 5 wherein said liquid conduit means includes volume varying means adjacent the other of said end portions operative to adjustably vary the internal volume of said liquid conduit means intermediate the opposite ends thereof.

7. The combination of claim 6 wherein said volume varying means includes an expandable and contractable reservoir communicated with said liquid conduit means midportion.

8. The combination of claim 5 wherein said float includes an upper end portion projectable from the terminal end of said one end portion, said switch means including a shiftable contact portion engageable by said upper end portion of said float for actuation of said switch means.

9. An elevation indicating device including a pair of supports stationarily supportable relative to base and remote support structures, a pair of transparent upright tubular members supported from said supports, a flexible hose having its opposite ends sealingly connected to the lower ends of said tubular members, a float loosely received in one of said tubular members for free vertical shifting therein in response to increases and decreases in the level of liquid in said one tubular member, switch means stationarily supported on said one tubular member, and with which said float is operatively associated for opening and closing said switch means in response to vertical oscillation of said liquid in said one tubular member, and indicator means including an electrical signal generator stationarily supported on the other tubular member, only, and with which said switch means is electrically connected for sole controlling actuation and deactuation of said signal generator means, through said switch means, responsive to vertical oscillation of said float.

10. The combination of claim 9 wherein said one tubular member and the corresponding support include coacting structure for supporting said one tubular member for adjustable vertical shifting relative to the corresponding support.

11. A support for support from a suitable base, a transparent tubular member including first and second end portions, said first end portion opening upwardly, means supporting said tubular member first end portion from said support, flexible elongated liquid passage means having one end communicated with the second end portion of said tubular member, said tubular member first end portion having a float loosely received therein for free vertical shifting in response to increases and decreases in the level of liquid in said first end portion upon which said float is floated, said tubular member first end portion being open, normally open switch means stationarily vertically adjustably supported on said tubular member first end portion relative to said float, switch actuator means carried by said float and operable to close said switch means upon upward movement of said float in said tubular member to a switch actuating position predetermined by the vertical adjustment of said switch means relative to said first end portion of said tubular member, indicator means including an electrically actuatable signal generator supported from the other end portion, only, of said passage means and with which said switch means is electrically connected for sole controlling operation of said signal generator in response to upward vertical shifting of said switch actuator means to said switch actuating position to close said switch means, at least said other end of said passage means being transparent, whereby the shifting of liquid level therein sufficient to elevate said float in said tubular member, and thus said switch actuator means to said switch actuating position, may be closely visually monitored.

* * * * *